Patented Mar. 27, 1945

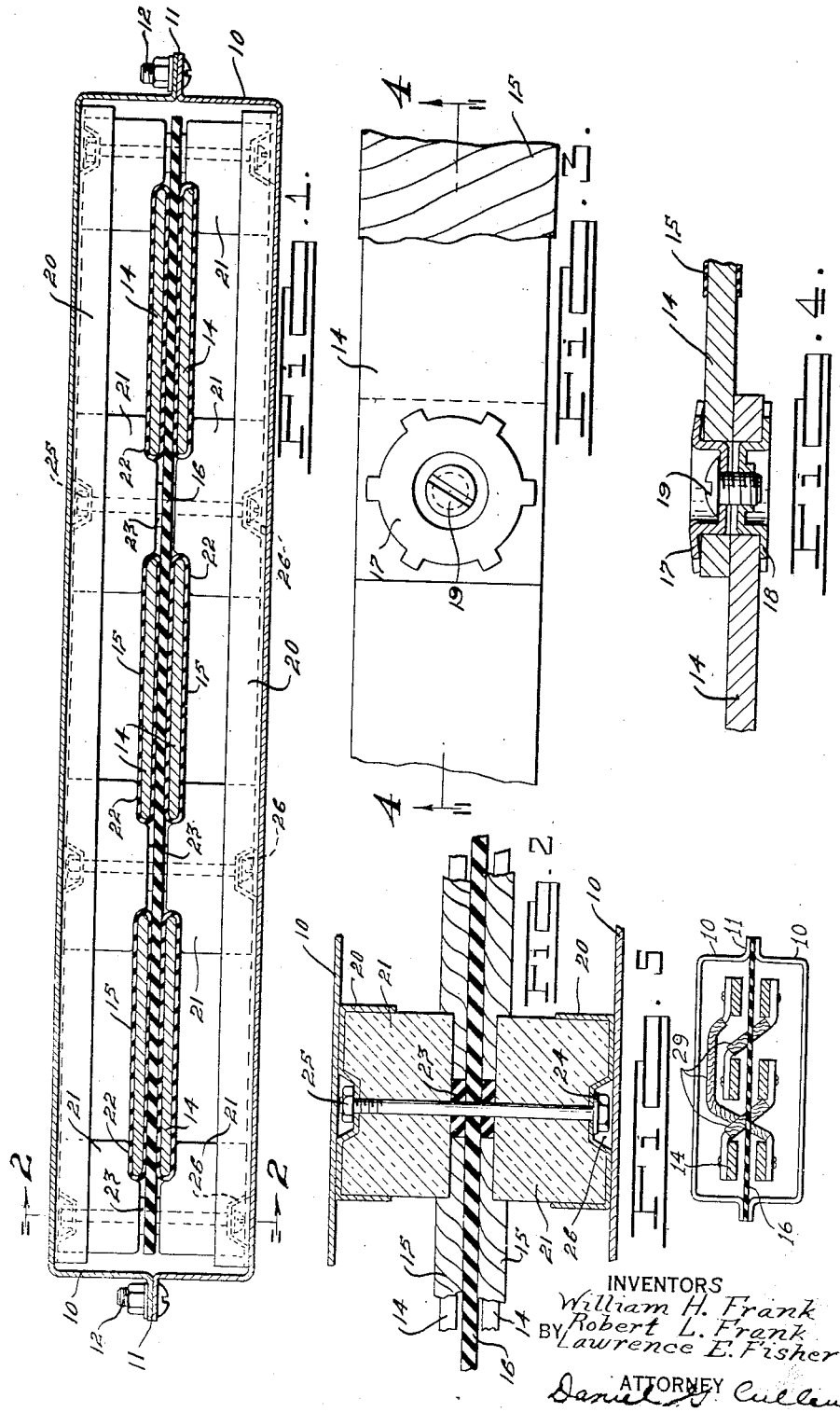

2,372,267

UNITED STATES PATENT OFFICE 2,372,267

ELECTRICAL DISTRIBUTION SYSTEM

William H. Frank, Robert L. Frank, and Lawrence E. Fisher, Detroit, Mich.

Application July 18, 1942, Serial No. 451,412

1 Claim. (Cl. 174—99)

This application relates to electrical distribution systems.

In a prior Patent No. 2,287,502 of June 23, 1942, particularly Figs. 1–3, and in a prior application Serial No. 421,378 filed December 2, 1941, now Patent No. 2,343,216 of February 29, 1944, there are disclosed various arrangements for supporting and maintaining in assembly the conductors of an electrical distribution system. The system hereof is generally similar to the above mentioned systems and this application discloses a different and supporting arrangement than those of the applications just mentioned, preserving, however, the relative arrangements and spacings of the conductors and casing, as set forth in the descriptions of the above mentioned systems.

In the Patent No. 2,287,502 the conductor supporting and spacing arrangements include pedestal type insulators 50, cross pieces 50A and bolts 52. Insulation 23—24 separates conductors of opposite polarity.

In Patent No. 2,343,216 cross bars 20—23, E type insulator blocks 21, and spring hooks 24 are utilized and no solid insulation is employed between the conductors of opposite polarity comparable to the insulation 23—24 of Patent 2,287,502.

In this application a different construction is provided and the same will now be described upon reference to the appended drawing.

In this drawing,

Fig. 1 is a transverse section view.

Fig. 2 is a detailed section on line 2—2 of Fig. 1.

Fig. 3 is a detailed view of the arrangement for securing lapping ends of conductors.

Fig. 4 is a section on line 4—4 of Fig. 3.

Fig. 5 shows a bus bar connection arrangement.

In a system of the character described, unit lengths of encased bus bars are joined end to end to form a run of encased bus bars. The casing of each unit length is longitudinally split to provide casing halves 10 having flanges 11 joined by bolts 12. The casing length contains lengths 14 of thin wide flat bus bars or conductors each of which is wrapped with insulation tape 15. A solid insulation sheet 16 separates the bus bars which are arranged in pairs. The two conductors of each pair are of different phases and the six conductors shown are arranged for three phase distribution and each phase includes a conductor of two different pairs. In the arrangement shown in Fig. 1, the conductors may be considered as of three phases ABC with the arrangement such as that of Fig. 5 which shows an arrangement $$\frac{ABC}{CAB}$$

with tie straps 29 used to connect bus bars AA, BB, and CC.

For tightly securing the lapping portions of the bus bars spring steel washers 17, splined nuts 18 and bolts 19 are employed, as shown in Figs. 3 and 4.

At longitudinally spaced points, there are disposed metal channels or cross bars 20 arranged in two sets; one set may be welded to the lower casing half 10 and is preferably so arranged; the other set is against but not secured directly to the upper casing half 10. Disposed within the cross bars 20 are insulating blocks 21 having notches or grooves 22 formed for receiving the edges of the bus bars. Washers 23 and the insulation 16 which spaces the bus bars of a pair relatively, serve to space the upper row of blocks 21 from the lower row. Bolts 24 threaded into nuts 25 pass through openings in the insulation 16, the washers 23, the blocks 21, and the cross bars 20 to hold the blocks, the cross bars and insulation in a tight and firm unitary assembly. The heads of the bolts and the nuts 25 are received within dimpled embossments 26 seating in complementary dimples of the blocks 21, which help relatively locate the parts 21—20 during assembly.

The arrangement herein disclosed suitably maintains the conductors in place without piercing or damaging the bus bars or the insulation covering or tape 15 wrapped around them, and adequately restrains shifting of the conductors whether the bus bars are installed in a run with the axis of the bolts 24 horizontal or vertical.

The entire assembly of all the parts shown except the casing halves and their bolts 12 may be made outside of the casing halves and then disposed within casing halves; or else a conductor run may be installed, after which the casing halves may be mounted around the installed bus bar run. However, neither of the foregoing assembly procedures and insulation procedures is as desirable as a procedure wherein cross bars 20 are welded to one of the casing halves and then the bus bars and blocks and the other cross bars 20 and the bolts 24 are assembled with respect to that lower casing half and after which the upper casing half is applied, to form a complete unit length or section of bus way to be installed in a run by being joined end to end with other unit lengths.

The inter-pair spacing is clearly shown to be considerably greater than the intra-pair spacing of the conductors and the blocks 21 and the bolts 24 are disposed within the large inter-pair spaces.

The cross bars 20 and the bolts 24 form iron loops around the pairs of conductors and while this is ordinarily considered objectionable in alternating current distribution systems, it is found not to be objectionable here because of the arrangement of pairs and phases of the conductors. Further the blocks and the bolts are dimensioned the same regardless of the width of the conductors. It is present practice to make the conductors of varying width for varying capacities of distribution systems; by using our arrangements, the same blocks 21 and bolts 24 may be utilized regardless of the varying width of the conductors. Only the widths of the conductors themselves, the widths of the casing halves, and the lengths of the cross bar 20 will vary.

Variations in sizes may be obtained very simply, because the arrangement herein disclosed does not depend upon standardized conductor width so much as it depends upon standardization of the thickness of the conductors, the spacing between the conductors, and also between the conductors and the casing, and the depth of the casing. These standards are very easy to maintain and the arrangement herein shown may be utilized for varying sizes of bus way systems without changing the sizes or dimensions of the blocks 21 or the bolts 24.

In addition, the arrangement herein disclosed is such that there is no requirement for perforating the casing in order to mount the conductors or other parts in place and to hold them securely. Excessive perforation in casings of distribution systems is considered undesirable. No such perforation is required in the system herein shown.

In addition, excessive manipulation of the heavy and large casing sections for mounting the conductors therein is eliminated here because of the arrangement disclosed.

An assembly bench of the character shown in Patent No. 2,343,216 may be employed. A casing section 10 may be laid on that bench and the cross members 20, if not already welded thereto, may be welded to it at that time; bolts 24 will be passed through the cross bars 20 before they are welded to the lower casing section. Then the blocks and the conductors and the insulation are built up over the lower cross bars and bolts, after which the nuts 25 are threaded onto the upper or free ends of the bolts 24, then the upper casing section 10 may be laid over the assembly and bolted to the fitted lower casing section 10 already on the bench.

Now having described the system herein disclosed, reference should be had to the claim which follows:

We claim:

In a polyphase electrical distribution system, a plurality of laterally spaced pairs, each pair comprising transversely spaced elongated conductors, the inter-pair spacing being greater than the intra-pair spacing, with each phase including two conductors of different pairs and with each pair including two conductors of different phases, and means for tying together the said conductors into a unitary assembly comprising transverse cross bars, and bolts in the inter-pair spacing connecting the cross bars and drawing them towards each other for retaining the conductors in assembly, and means for maintaining the intra-pair spacing, and insulating blocks between the cross bars for restraining the shifting of the conductors laterally, thus maintaining their inter-pair spacings, the cross bars and the bolts being of ferrous metal and forming metal loops around the pairs of conductors.

WILLIAM H. FRANK.
ROBERT L. FRANK.
LAWRENCE E. FISHER.